(12) United States Patent
Lee et al.

(10) Patent No.: US 7,991,066 B2
(45) Date of Patent: Aug. 2, 2011

(54) TRANSMITTER, RECEIVER AND METHOD FOR CONTROLLING MULTIPLE INPUT MULTIPLE OUTPUT SYSTEM

(75) Inventors: Heesoo Lee, Daejeon (KR); Hyo Jin Lee, Daegu (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 550 days.

(21) Appl. No.: 11/721,161

(22) PCT Filed: Dec. 7, 2005

(86) PCT No.: PCT/KR2005/004187
§ 371 (c)(1),
(2), (4) Date: Nov. 29, 2007

(87) PCT Pub. No.: WO2006/062356
PCT Pub. Date: Jun. 15, 2006

(65) Prior Publication Data
US 2009/0252247 A1 Oct. 8, 2009

(30) Foreign Application Priority Data

Dec. 8, 2004 (KR) .................. 10-2004-0103244
Aug. 23, 2005 (KR) .................. 10-2005-0077485

(51) Int. Cl.
*H04B 7/02* (2006.01)
(52) U.S. Cl. ..................................... 375/267
(58) Field of Classification Search .......... 375/267
See application file for complete search history.

(56) References Cited

U.S. PATENT DOCUMENTS

| | | | |
|---|---|---|---|
| 6,751,187 B2 | 6/2004 | Walton et al. | |
| 2003/0108117 A1 | 6/2003 | Ketchum et al. | |
| 2004/0204104 A1 | 10/2004 | Horng et al. | |
| 2005/0195889 A1* | 9/2005 | Grant et al. | 375/148 |
| 2005/0220211 A1* | 10/2005 | Shim et al. | 375/267 |
| 2005/0265465 A1* | 12/2005 | Hosur et al. | 375/260 |

FOREIGN PATENT DOCUMENTS

| | | |
|---|---|---|
| KR | 10-2003-0059686 A | 7/2003 |
| KR | 10-2004-0085680 A | 10/2004 |
| KR | 10-2004-0098768 A | 11/2004 |
| WO | WO 03/034610 A2 | 4/2003 |

* cited by examiner

*Primary Examiner* — Shuwang Liu
*Assistant Examiner* — Michael R Neff

(57) ABSTRACT

Provided is a method of controlling a multiple input multiple output (MIMO) system. One embodiment of the method includes the steps of: estimating, at a receiver, a MIMO channel and detecting data streams using a successive interference cancellation scheme; calculating, at the receiver, S and P using the estimated channel and then feeding back information corresponding to $(P_1, P_2, \ldots, P_{M-1}, SINR^5_M)$ to a transmitter, and determining, at the transmitter, a transfer rate and transmission power perstream using the fed-back information. Another embodiment of the method includes the steps of: estimating, at a receiver, a MIMO channel and detecting data streams using a signal received from an antenna; extracting, at the receiver, a feedback parameter to be fed back to the transmitter using the estimated channel, and feeding back the feedback parameter to the transmitter, and determining, at the transmitter, a stream to be allocated to the receiver from among the streams of the transmitter using the fed-back parameter and a data transfer rate per stream, wherein the feedback parameter is information corresponding to a successive interference cancellation order and a signal-to-interference-plus-noise ratio (SINR) per stream reflecting successive interference cancellation.

17 Claims, 3 Drawing Sheets

TRANSMITTER, RECEIVER AND METHOD FOR CONTROLLING MULTIPLE INPUT MULTIPLE OUTPUT SYSTEM

TECHNICAL FIELD

The present invention relates to a method of controlling a multiple input multiple output (MIMO) system, and a transmitter and a receiver which can be used in the system, and more particularly, to a method of controlling a MIMO system capable of increasing its capacity, and a transmitter and a receiver which can be used in the system.

BACKGROUND ART

A MIMO scheme using a plurality of antennas in a transmitter and a receiver is at the forefront of techniques noted for having the potential to improve the performance of wireless/mobile communication systems by increasing frequency efficiency and transmission/reception diversity.

As one conventional technique of a MIMO system, there is a singular value decomposition (SVD) method. The SVD method allows a transmitter to exhibit maximum performance by singular value decomposition of complete channel environmental information fed back from a receiver. However, generally, in systems such as a frequency division duplexing (FDD) system, a transmitter should be provided with information on a channel matrix by a receiver. Since this information is quite copious, such a system cannot easily be applied to an environment in which a channel varies over time. To solve this problem, techniques of feeding back only limited channel information to a transmitter to improve performance have been researched and developed. Such techniques include a per antenna rate control (PARC) method, a per stream rate control (PSRC) method, a per unitary basis stream user rate control (PU2RC) method, and so forth.

Among these techniques, the PARC method allows a receiver to use a successive interference cancellation reception scheme and to feed back only information about signal-to-interference-plus-noise ratios (SINRs) of antennas, and thereby can obtain a theoretical open loop channel capacity of a MIMO channel.

While the PARC method allows each data stream to be separately transmitted through each antenna, the PSRC method allows each data stream to be precoded using a unitary matrix fed back from a receiving terminal and each of the precoded data streams to be transmitted. The PSRC method allows a receiver to feed back information on which of a plurality of unitary matrices capable of being used for precoding is to be used in a transmitting terminal, so that the transmitting terminal can perform precoding using each row vector of the unitary matrix and transmit each precoded data stream. The receiver also feeds back SINRs of each data stream to be precoded, and the transmitting terminal determines data transfer rates of each stream with each SINR and sends the data.

Unlike the PARC and PSRC methods which improve link performance among transmitting and receiving terminals, the PU2RC method improves performance by utilizing multi-user diversity when there are multiple terminals using multiple antennas. When a base station transmits a plurality of data streams, the PU2RC method allows each data stream to be precoded using each column vector of a unitary matrix and the precoded data streams to be transmitted, which is the same as the PSRC method. One thing different from the PSRC method is that the PU2RC method transmits each data stream to other users. According to the PU2RC method, a SINR of a data stream is fed back from each user and the data stream is allocated to a user having the best SINR, thereby improving system performance.

Both of the conventional PARC and PSRC methods of a MIMO system should uniformly maintain the transmission power of each antenna or each data stream, and thus provide less channel capacity than a method capable of adjusting transmission power. All of the methods require that all antennas or data streams have the same transmission power. When it is assumed that all antennas or data streams are allotted the same share of transmission power from a base station, a receiving terminal feeds back the SINR of a case where a successive interference cancellation scheme is used. The same power is supplied even to the antenna or data stream having the worst SINR. If the power supplied to the specific antenna or data stream is reduced or removed and additionally supplied to another antenna or data stream having a better SINR, and a transmission rate of the data stream is increased, a sum of data transmission rates can be increased. However, according to the methods, a transmitter cannot discretionarily vary transmission power because SINR information fed back to a receiver is calculated on the assumption that all antennas or data streams have the same transmission power. If a transmitting terminal varies the transmission power, the reception SINRs of each data stream cannot be known.

Compared to the PARC and PSRC methods, the PU2RC method has an advantage in that performance can be improved using multi-user diversity in a multi-user environment, but has a drawback in that interference between data streams cannot be cancelled using the successive interference cancellation scheme. On the other hand, compared to the PU2RC method, the PARC and PSRC methods can cancel interference between data streams using the successive interference cancellation scheme, but cannot improve performance using multi-user diversity in a multi-user environment. The performance of the two classified methods substantially depends on the number of users in the system and the channel environment. In general, the PU2RC method exhibits good performance in a channel environment which has a lot of users and is close to a line of sight (LOS) environment. In contrast, the PARC and PSRC methods exhibit good performance in a channel environment which has relatively few users and is close to a rich-scattering environment.

DISCLOSURE

Technical Problem

One object of the present invention is to provide a method of controlling a MIMO system which can increase channel capacity, and a transmitter and receiver which can be applied to the system.

Another object of the present invention is to provide a method of controlling a MIMO system, and a transmitter and receiver which can be applied to the system, wherein the MIMO system feeds back the same amount of information as in the PARC and PSRC methods but is capable of effectively varying transmission power to overcome the PARC and PSRC methods limitation of transmission power being the same for all antennas or data streams.

Yet another object of the present invention is to provide a method of controlling a MIMO system, and a transmitter and receiver which can be applied to the system, the MIMO system overcoming the conventional PARC, PSRC, and PU2RC methods limitation of performance depending upon the number of users and the channel environment, and exhibiting better performance than the conventional methods in any environment.

Technical Solution

The first aspect of the present invention provides a method of controlling a MIMO system in which a receiver and transmitter use multiple antennas, comprising the steps of: estimating, at the receiver, a MIMO channel and detecting data streams using the successive interference cancellation scheme; calculating, at the receiver, $\overline{S}$ and $\overline{P}$ satisfying Formula 1 below using the estimated MIMO channel and feeding back information corresponding to $[\overline{p_1}, \overline{p_2}, \ldots, \overline{p_{M-1}}, \text{SINR}_M^{\overline{s}}]$ to the transmitter; and determining, at the transmitter, a data transmission rate and transmission power per data stream.

$$p_1 + \frac{p_1}{SINR_1^s} = p_2 + \frac{p_2}{SINR_2^s} = \ldots = p_M + \frac{p_M}{SINR_M^s} \qquad \text{Formula 1}$$

$$\sum_{1 \le k \le M} p_k = P$$

In Formula 1, s represents a successive interference cancellation order, p represents the transmission power per stream, $SINR_k^s$ represents a SINR of a stream k when a signal of a stream prior to the stream k is completely removed, and P represents the power of the transmitter.

The second aspect of the present invention provides a MIMO receiver comprising: a symbol detection unit and a decoding unit for restoring a plurality of data streams from a signal received from an antenna using the successive interference cancellation scheme; a multiplexing unit for multiplexing and then outputting the data streams; a channel estimation unit for estimating MIMO channel information based on the signal received from the antenna; and a feedback parameter extraction unit for extracting a parameter to be fed back to a transmitter using the estimated MIMO channel information. The feedback parameter is information corresponding to $[\overline{p_1}, \overline{p_2}, \ldots, \overline{p_{M-1}}, \text{SINR}_M^{\overline{s}}]$, and $\overline{S}$ and $\overline{P}$ are values satisfying Formula 1 above.

The third aspect of the present invention provides a MIMO transmitter comprising: a demultiplexing unit for transforming high-rate user data into a plurality of low-rate data streams; a plurality of encoding units for channel-encoding the data streams; a plurality of symbol mappers for mapping the encoded data streams into symbols; a plurality of precoding/antenna mapping units for multiplying the symbols by precoding vectors and sending the multiplied symbols to transmitting antennas, or sending the multiplied symbols via antenna mapping to antennas; and an adaptive transmission control unit for controlling transmission power and data transfer rate per stream using a received feedback parameter. The feedback parameter is information corresponding to $[\overline{p_1}, \overline{p_2}, \ldots, \overline{p_{M-1}}, \text{SINR}_M^{\overline{s}}]$, and $\overline{S}$ and $\overline{P}$ are values satisfying Formula 1 above.

The fourth aspect of the present invention provides a method of controlling a MIMO system which includes a transmitter having multiple antennas and a plurality of receivers each having multiple antennas and in which each user data to be sent to each receiver is sent through streams allocated to each user among a plurality of streams transmitted from the transmitter, the method comprising the steps of: estimating, at a receiver, a MIMO channel and detecting data streams using a signal received from an antenna; extracting, at the receiver, feedback parameters to be fed back to the transmitter using the estimated channel and feeding back the parameter to the transmitter; and determining, at the transmitter, streams to be allocated to the receiver from among the streams of the transmitter using the fed-back parameters and data transfer rate per stream, wherein the feedback parameters are information including to a successive interference cancellation order and SINR per stream reflecting successive interference cancellation.

The fifth aspect of the present invention provides a MIMO receiver used in a MIMO system which includes a transmitter having multiple antennas and a plurality of receivers each having multiple antennas and in which each user data to be sent to each receiver is sent through streams allocated to each user among a plurality of streams transmitted from the transmitter, the MIMO receiver comprising: a symbol detection unit and a decoding unit for restoring a plurality of data streams from signals received from antennas using the successive interference cancellation scheme; a multiplexing unit for multiplexing and outputting data streams allocated to the receiver among the data streams; a channel estimation unit for estimating MIMO channel information based on the signal received from the antenna; and a feedback parameter extraction unit for extracting parameters to be fed back to the transmitter using the estimated MIMO channel information, the parameters being a successive interference cancellation order and SINR per stream reflecting successive interference cancellation.

The sixth aspect of the present invention provides a MIMO transmitter comprising: a user selection unit for allocating a plurality of input user data to each stream (Here, a plurality of streams can be allocated to one user, in which case data of the user is demultiplexed into a plurality of low-rate data and each low-rate data is allocated to one stream.); a plurality of encoding units for channel-encoding a plurality of data streams output from the user selection unit; a plurality of symbol mappers mapping the encoded data streams into symbols; a plurality of precoding/antenna mapping units for multiplying the symbols by precoding vectors and sending each multiplied vector signal to transmitting antennas, or sending each symbol to an antenna via only antenna mapping; and an adaptive transmission control unit for determining which streams the input user data are allocated to and a data transfer rate per stream, using the received feedback parameters which are a successive interference cancellation order and SINR per stream reflecting successive interference cancellation.

ADVANTAGEOUS EFFECTS

The method of controlling the MIMO system, and the transmitter and receiver which can be used in the system, according to the present invention have the advantage of increased channel capacity.

The method of controlling the MIMO system, and the transmitter and receiver which can be used in the system, according to the present invention have the additional advantage of enabling transmission power to be effectively varied with the same amount of feedback information as a PARC system, a PSRC system, etc.

The method of controlling the MIMO system, and the transmitter and receiver which can be used in the system, according to the present invention have the further advantage of overcoming limitations of the conventional methods such as PU2RC, PARC, and PSRC and thus exhibiting superior performance in any environment.

MODE FOR INVENTION

Hereinafter, exemplary embodiments of the present invention will be described in detail. However, the present invention is not limited to the exemplary embodiments disclosed below, but can be implemented in various types. Therefore, the present exemplary embodiment is provided for complete disclosure of the present invention and to fully inform the scope of the present invention to those ordinarily skilled in the art.

Figure 1:
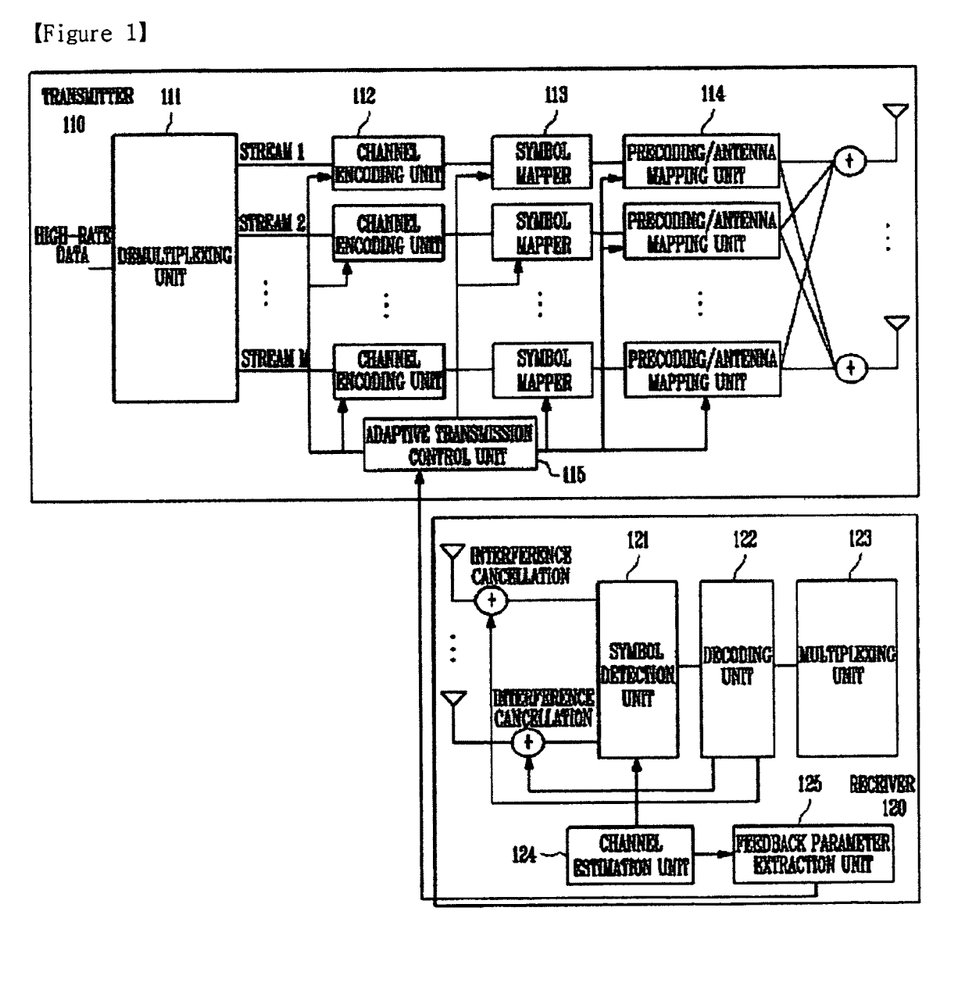
FIG. 1 is a block diagram illustrating a MIMO system according to a first exemplary embodiment of the present invention.

FIG. 1 is a diagram illustrating a multiple input multiple output (MIMO) system according to a first exemplary embodiment of the present invention. Referring to FIG. 1, the MIMO system comprises a transmitter 110 and a receiver 120. The transmitter 110 includes a demultiplexing unit 111, a plurality of channel encoding units 112, a plurality of symbol mappers 113, a plurality of precoding/antenna mapping units 114, and an adaptive transmission control unit 115. The receiver 120 includes a symbol detection unit 121, a decoding unit 122, a multiplexing unit 123, a channel estimation unit 124, and a feedback parameter extraction unit 125.

High-rate user data passes through the demultiplexing unit 111 and is separated into a plurality of low-rate data streams. The data streams pass through the channel encoding units 112 and are encoded. The encoded data streams pass through the symbol mappers 113 and are symbolized. The resulting symbols are multiplied by precoding vectors corresponding to each stream at the precoding/antenna mapping units 114 and sent to transmitting antennas, or are sent to the transmitting antennas via only antenna mapping. The precoding vectors corresponding to each stream may be specific fixed vectors or may vary according to a command of the adaptive transmission control unit 115 on the basis of a precoding vector fed back from the receiver.

In the receiver 120, a vector signal is received through antennas and detected through a predetermined order by the symbol detection unit 121. The first detected signal passes through the decoding unit 122 and is decoded into original information which is then multiplexed at the multiplexing unit 123. The signal decoded by the decoding unit 122 is encoded back into a signal transmitted from an original transmitting terminal. The signal is multiplied by the MIMO channel and the result is subtracted from the received signal. Thereby, the first detected signal does not interfere with other residual data streams at all. This is the general successive interference cancellation reception scheme. In the present invention it is assumed that such a successive interference cancellation reception scheme is used at the receiver 120. In addition, in the present invention it is assumed that the receiver 120 can estimate a MIMO channel using the channel estimation unit 124. The estimated channel is input to the symbol detection unit 121 and used for detecting each data stream.

In addition, a MIMO channel matrix is estimated by the channel estimation unit 124 and input to the feedback parameter extraction unit 125 which processes information about the estimated MIMO channel matrix to be sent to the transmitter 110. The information extracted by the feedback parameter extraction unit 125 is fed back to the transmitter 110. Based on the information obtained from the feedback parameter extraction unit 125, the adaptive transmission control unit 115 determines how to send each data stream, and controls the channel encoding units 112, the symbol mappers 113, and the precoding/antenna mapping units 114 accordingly.

The transmitter 110 and the receiver 120 shown in FIG. 1 are structurally similar to a transmitter and receiver employing a per antenna rate control (PARC) method and a per stream rate control (PSRC) method. However, in the transmitter 110 and the receiver 120 shown in FIG. 1, the information fed back from the receiver 120 to the transmitter 110 is different from the signal-to-interference-plus-noise ratio (SINR) per stream fed back from the receivers to the transmitters according to the PARC and PSRC methods, and thus the feedback parameter extraction unit 125 and the adaptive transmission control unit 115 perform different operations. In addition, the transmitter 110 shown in FIG. 1 can vary not only a data transmission rate but also a transmission power so that the precoding/antenna mapping units 114 can have a different structure. In other words, the precoding/antenna mapping units 114 can control the transmission power of a signal output of a stream according to control of the adaptive transmission control unit 115. The precoding/antenna mapping units 114 adjust the magnitude of a precoding vector to control the transmission power of a signal output per stream.

The feedback parameter extraction unit 125 and the adaptive transmission control unit 115 of the first exemplary embodiment operate as follows. First, the channel estimation unit 124 of the receiver 120 estimates a MIMO channel. Here, if the matrix of the estimated channel is denoted as H, then $H_{ij}$, the value of the element at the j-th column and i-th row of H, is the channel value between a j-th transmitting antenna and an i-th receiving antenna. In addition, consider $H_j$ as the j-th column vector of the MIMO channel matrix.

In general, when one data stream is precoded with a vector of a unitary matrix U, a vector signal of the data stream is transmitted through a number of antennas. However, assuming that a MIMO channel matrix is HU, it can also be considered as one data stream being transmitted through one antenna. Therefore, for convenience, it shall be assumed hereinafter that one data stream is transmitted through only one antenna.

Below, M denotes the number of transmitting antennas, N denotes the number of receiving antennas, and $p_k$ denotes transmission power for the K-th antenna data stream. When S denotes a set of permutations of a set $\{1, 2, ? M\}$ and s?S, $s_k$ is the k-th element of s. When an antenna data stream is decoded in a sequence of s during a successive interference cancellation process of the decoding unit 122, a reception signal $y_k$ for a $s_k$-th data stream is given by Formula 2:

$$y_k = \sqrt{p_{s_k}} H_k x_k + \sum_{k<t\leq M} \sqrt{p_{s_t}} H_{s_t} x_{s_t} + n \qquad \text{Formula 2}$$

Here, $x_k$ is a transmission signal of the k-th antenna stream, and n is a noise vector.

A SINR of the signal varies according to a reception algorithm. For example, when a minimum mean square error (MMSE) algorithm is used as the reception algorithm, an antenna transmission power vector is p={$p_k$}, and an optimal MMSE weighting vector is w(p), a reception SINR is given by Formula 3:

$$SINR_{s_k}^{MMSE}(p) = \frac{p_{s_k}|w^*(p)H_k|^2}{\sum_{k<t\leq M} p_{s_t}|w^*(p)H_{s_t}|^2 + |w^*(p)n|^2}$$ Formula 3

In order to maximize an optimal theoretical channel capacity, the solution of Formula 4 is generally calculated:

$$\max_{s,p} \sum_{1<k\leq M} \log_2(1 + SINR_{s_k}(p))$$ Formula 4 s.t. $1^t p \leq P$

Here, P is maximum transmission power of the transmitter.

Permutation s and transmission power p of each antenna solve the above optimization problem and allow a maximum channel capacity to be obtained. The feedback parameter extraction unit 125 solves the above optimization problem and feeds back p of the solution and the SINR of each antenna to the transmitter 110. The adaptive transmission control unit 115 of the transmitter 110 controls the power and transfer rate of each antenna on the basis of the information received in this manner. The fed-back transmission power value is used for the transmission power, and data is sent at a data transfer rate matching a fed-back SINR and satisfying a required PER. This method optimizes transmission power, sends data at a transfer rate according to each SINR, and thereby guarantees a higher channel capacity than the PARC method, the PSRC method, etc. However, compared to the conventional PARC and PSRC methods, double the amount of information is fed back according to this method.

However, the MIMO system shown in FIG. 1 has the same amount of feedback information as a PARC system or a PSRC system but uses a method which varies transmission power according to antenna streams and thereby improves performance. In general, when there are a plurality of orthogonal channels whose noise powers are given by $\delta_1^2, \delta_2^2, \ldots, \delta_M^2$, a water-filling method is a known power allocation method that makes a sum of channel capacities as large as possible. Here, an optimal solution according to the water-filling method is given by Formula 5:

$$\delta_1^2 + p_1 = \delta_2^2 + p_2 = \ldots = \delta_M^2 + p_M = \Omega$$ Formula 5 if $\Omega < \delta_q^2$, $p_q = 0$ $$\sum_{1<k\leq M} p_k = P$$

When a sum of a noise level and a magnetic signal level is fixed and the noise level is larger than the sum, power is not allocated. However, this is a solution for orthogonal channels which do not interfere with one another. When a receiver uses the successive interference cancellation scheme, data streams passing through the receiver are not exactly orthogonal. That is, when the successive interference cancellation scheme is used, while streams to be decoded earlier do not interfere with streams to be decoded later, signals of the streams to be decoded later do interfere with signals of the streams to be decoded earlier. Therefore, the data streams passing through the receiver are not exactly orthogonal, but have an orthogonal characteristic. Thus, when powers are allocated as shown in Formula 5, performance can be improved.

When s denotes a successive interference cancellation order (decoding order), a vector p represents power allocated to each antenna (data stream), a signal of a stream prior to an antenna k is completely removed, and $SINR_k^s$ denotes a SINR of the antenna k, then power is allocated as p satisfying Formula 6:

$$p_1 + \frac{p_1}{SINR_1^s} = p_2 + \frac{p_2}{SINR_2^s} = \ldots = p_M + \frac{p_M}{SINR_M^s}$$ Formula 6

$$\sum_{1\leq k\leq M} p_k = P$$

After calculating $\overline{S}$ and $\overline{P}$ satisfying the formula, the feedback parameter extraction unit 125 sends information of Formula 7 to the transmitter 110:

$$[\overline{p_1}, \overline{p_2}, \ldots, \overline{p_{M-1}}, SINR_M^{\overline{s}}]$$ Formula 7

The adaptive transmission control unit 115 of the receiver 110 receives the above channel information and uses the fed-back values as transmission powers of first through (M−1)th antenna data streams, and calculates transmission power of an M-th antenna by Formula 8:

$$P - \sum_{1\leq k\leq M-1} p_k$$ Formula 8

SINRs for the first through the (M−1)th antenna data streams are calculated by Formula 9:

$$SINR_j^{\overline{s}} = \frac{p_j SINR_M^{\overline{s}}}{(p_M - p_j)SINR_M^{\overline{s}} + p_M}$$ Formula 9

Data transfer rates of each data stream are determined using the SINRs of the antenna streams.

According to the method provided above, only M number of data of $[\overline{p_1}, \overline{p_2}, \ldots, \overline{p_{M-1}}, SINR_M^{\overline{s}}]$ is fed back. This is the same amount of information fed back according to the PARC and PSRC methods. With the same amount of feedback information, it is possible not only to control the transfer rate per stream, but also to control the transmission power to improve a data transfer rate.

While the first exemplary embodiment of the present invention described above provides a method for improving performance in one given transmission/reception link, a second exemplary embodiment of the present invention provides a method for improving performance when multiple users have multiple antennas. As briefly mentioned above in the discussion of related art, the per unitary basis stream user rate control (PU2RC) method allows an appropriate stream to be allocated to each user in a multi-user MIMO environment. According to the PU2RC method, each stream is multiplied by a precoding vector corresponding to the stream and transmitted through multiple antennas.

According to the PU2RC method, each data stream is precoded with a unitary vector and then allocated to each user. This method improves the performance of a system using multi-user diversity. However, compared to the PARC or PSRC method, the PU2RC method has the disadvantage of being unable to eliminate interference between streams. The method according to the second exemplary embodiment of the present invention attains multi-user diversity and eliminates interference through the successive interference cancellation scheme.

Figure 2:
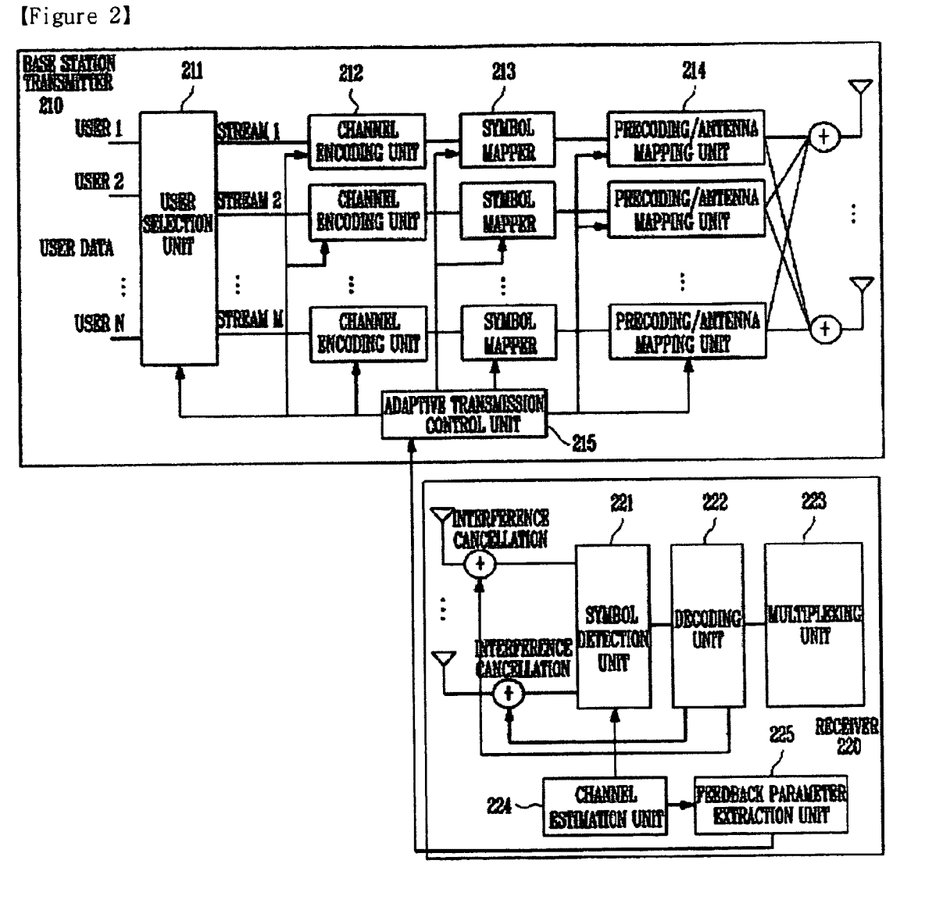
FIG. 2 is a block diagram illustrating a MIMO system according to a second exemplary embodiment of the present invention.

FIG. 2 is a diagram illustrating a MIMO system according to the second exemplary embodiment of the present invention. Referring to FIG. 2, the MIMO system comprises a transmitter 210 and a receiver 220. The transmitter 210 includes a user selection unit 211, a plurality of channel encoding units 212, a plurality of symbol mappers 213, a plurality of precoding/antenna mapping units 214, and an adaptive transmission control unit 215. The receiver 220 includes a symbol detection unit 221, a decoding unit 222, a multiplexing unit 223, a channel estimation unit 224, and a feedback parameter extraction unit 225.

The transmitter 210 and the receiver 220 shown in FIG. 2 are structurally and operationally similar to the transmitter 110 and the receiver 120 shown in FIG. 1 down to the level of most of their constituent units. However, since a successive interference cancellation order (decoding order) and SINRs of streams reflecting successive interference cancellation are fed back to the transmitter 210, the feedback parameter extraction unit 225 and the adaptive transmission control unit 215 operate differently from the feedback parameter extraction unit 125 and the adaptive transmission control unit 115 shown in FIG. 1. In addition, the MIMO system shown in FIG. 2 allocates the streams to a number of users and thus includes a user selection unit 211 allocating user data to each stream under the control of the adaptive transmission control unit 215. For example, when there are four antennas at the base station and three users, the stream 1 may be allocated to a user 1, antennas 2 and 3, i.e., streams 2 and 3 may be allocated to a user 2, and a stream 4 may be allocated to the user 3. When a plurality of streams are allocated to one user like the user 2 of the example, the user selection unit 211 divides data of the user 2 into two parallel low-rate data and allocates each data to one stream. Specifically, one of the two parallel low-rate data is allocated to the stream 2, and the other is allocated to the stream 3.

The largest difference between operation of the transmitter 210 and the receiver 220 shown in FIG. 2 and the PU2RC method is that the transmitter 210 and the receiver 220 shown in FIG. 2 feed back a successive interference cancellation order (decoding order) and SINRs reflecting the successive interference cancellation. In contrast, according to the PU2RC method, a decoding order is not fed back, and SINRs that do not reflect successive interference cancellation are fed back.

By the method described below, a successive interference cancellation order can be determined and SINRs according to the order can be calculated. However, the present invention is not limited to the method/algorithm described below.

The channel estimation unit 224 of the receiver 220 estimates the MIMO channel. Then, the SINR of the case where interference of other streams is not eliminated is calculated for each stream. The stream having the largest SINR among the calculated SINRs is selected. Here, the selected stream may be denoted as s1 and its SINR as SINR(s1). Subsequently, when it is assumed that interference of the signal generated from the data stream s1 is completely eliminated, SINRs of other streams are calculated. The stream having the largest SINR among the calculated SINRs is selected. Here, the selected stream may be denoted as s2 and its SINR as SINR(s2). Subsequently, when it is assumed that interference of the signal generated from the data streams s1 and s2 is completely eliminated, SINRs of other streams are calculated. The stream having the largest SINR among the calculated SINRs is selected. Here, the selected stream may be denoted as s3 and its SINR as SINR(s3). This process is repeatedly performed until all streams have been selected or the predetermined maximum number T of repetitions has been reached (T≦M). Subsequently, the feedback parameter extraction unit 225 feeds back the decoding order (successive interference cancellation order) of s1, s2, . . . , sT, and SINRs of SINR(s1), SINR(s2), . . . , SINR(sT) reflecting the successive interference cancellation, per stream, to the base station transmitter 210.

The base station transmitter 210 allocates each data stream to users using the above information fed back from all users on the following two conditions:

Condition 1: the same data stream cannot be allocated to more than one user.

Condition 2: in order to allocate the stream i to the user k, streams ahead of the stream i in the fed-back successive interference cancellation order (decoding order) from the user k must be allocated to the user k.

Each stream is allocated to users while satisfying the above conditions. Here, the base station transmitter 210 allocates the streams in such a manner as to maximize performance of the system.

For example, if the system includes three users, and the maximum number of transmission streams of the base station is four, the decoding orders (interference cancellation orders) fed back from each user are as follows:

User 1: 3, 1, 4, 2
User 2: 2, 3, 1, 4
User 3: 4, 2, 1, 3

When streams 2 and 3 are allocated to user 2, stream 4 can be allocated to user 3. However, remaining stream 1 cannot be allocated to user 1 because stream 3 must be previously allocated to user 1 in order to allocate stream 1 to user 1.

On the other hand, when streams 3 and 1 are allocated to user 1, stream 2 can be allocated to user 2. And also, stream 4 can be allocated to user 3 because this allocation satisfies the above conditions 1 and 2.

When a specific stream is allocated to a user, the data transmission rate for the stream is determined on the basis of the fed-back SINR.

Figure 3:
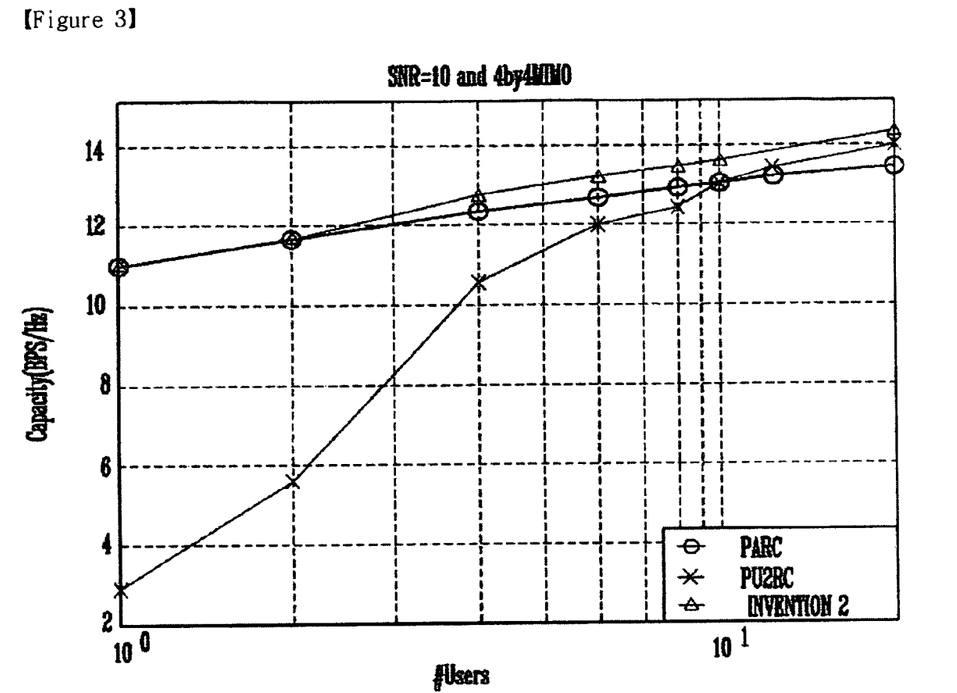
FIG. 3 is a graph of experimental results evidencing the improved performance of the MIMO system according to the second exemplary embodiment of the present invention.

FIG. 3 is a graph of experimental results evidencing the improved performance of the MIMO system according to the second exemplary embodiment of the present invention. In FIG. 3, the x-axis represents the number of users, and the y-axis represents the channel capacity measured in units of a transmission rate (bits per second (BPS)) per frequency (Hz). The simulation experiment was performed under conditions in which a signal-to-noise ratio (SNR) was 10 and the transmitter and receiver each had four antennas.

As a result of the simulation experiment, when there were a small number of users, a PARC system exhibited a larger capacity than a PU2RC system and thus was superior to the PU2RC system. On the other hand, when there were a large number of users, the PU2RC system exhibited a larger capacity than the PARC system and thus was superior to the PARC system. In addition, the MIMO system Invention 2 according to the second exemplary embodiment of the present invention exhibited a capacity at least as large as the larger capacity between the PARC and PU2RC systems regardless of the number of users. Therefore, from the results of the simulation experiment, it can be seen that the MIMO system Invention 2 according to the second exemplary embodiment of the present invention is superior to the PARC and PU2RC systems.

The invention claimed is:

1. A method of controlling a multiple input multiple output (MIMO) system including a transmitter and a receiver using multiple antennas, the method comprising the steps of:

estimating, at the receiver a MIMO channel and detecting data streams using a successive interference cancellation scheme;

calculating, at the receiver, $\overline{S}$ and $\overline{P}$ satisfying the formula given below using the estimated MIMO channel and then feeding back information corresponding to $[\overline{p_1}, \overline{p_2}, \ldots, \overline{p_{M-1}}, \text{SINR}_M^{\bar{s}}]$ to the transmitter, $$p_1 + \frac{p_1}{SINR_1^s} = p_2 + \frac{p_2}{SINR_2^s} = \ldots = p_M + \frac{p_M}{SINR_M^s}$$

$$\sum_{1 \leq k \leq M} p_k = P$$

wherein s represents a successive interference cancellation order, p represents transmission power per stream, $SINR_k^s$ represents a signal-to-interference-plus-noise ratio (SINR) of a stream k when a signal of a stream prior to the stream k is completely removed, M represents an integer number of data streams, and P represents the power of the transmitter; and determining, at the transmitter, a data transmission rate and transmission power per stream using the fed-back information.

2. The method according to claim 1, wherein in the step of determining the data transmission rate per stream, the transmission powers of first through (M−1)th streams are allocated as $[\overline{p_1}, \overline{p_2}, \ldots, \overline{p_{M-1}}]$, and the transmission power of an M-th stream is allocated as $P - \Sigma_{1 \leq k \leq M-1} \overline{p_k}$.

3. The method according to claim 1, wherein in the step of determining the transmission power per stream, SINRs for first through (M−1)th streams are calculated by the following formula:

$$SINR_j^s = \frac{p_j SINR_M^s}{(p_M - p_j)SINR_M^s + p_M},$$

and data transfer rates of each data stream are determined using the SINRs of each data stream, wherein j represents a specific transmitting antenna.

4. A multiple input multiple output (MIMO) receiver, comprising:

a symbol detection unit and a decoding unit for restoring a plurality of data streams from a signal received from an antenna using a successive interference cancellation scheme;

a multiplexing unit for multiplexing and outputting the data streams;

a channel estimation unit for estimating MIMO channel information based on the signal received from the antenna; and a feedback parameter extraction unit for extracting a parameter to be fed back to a transmitter using the estimated MIMO channel information, wherein the feedback parameter is information corresponding to $[\overline{p_1}, \overline{p_2}, \ldots, \overline{p_{M-1}}, \text{SINR}_M^{\bar{s}}]$, $SINR_k^s$ represents a signal-to-interference-plus-noise ratio (SINR) of a stream k when a signal of a stream prior to the stream k is completely removed, and $\overline{S}$ and $\overline{P}$ are values satisfying the following formula:

$$p_1 + \frac{p_1}{SINR_1^s} = p_2 + \frac{p_2}{SINR_2^s} = \ldots = p_M + \frac{p_M}{SINR_M^s}$$

$$\sum_{1 \leq k \leq M} p_k = P$$

wherein s represents a successive interference cancellation order, p represents transmission power per stream, M represents an integer number of data streams, and P represents the power of the transmitter.

5. A multiple input multiple output (MIMO) transmitter, comprising:

a demultiplexing unit for transforming high-rate user data into a plurality of low-rate data streams;

a plurality of channel encoding units for channel-encoding the data streams;

a plurality of symbol mappers for mapping the encoded data streams into symbols;

a plurality of precoding/antenna mapping units for multiplying the symbols by precoding vectors and sending the multiplied precoding vectors to transmitting antennas, or sending the symbols via antenna mapping to the transmitting antennas; and an adaptive transmission control unit for controlling transmission power and a data transmission rate per stream using the received feedback parameters, wherein the feedback parameter is information corresponding to $[\overline{p_1}, \overline{p_2}, \ldots, \overline{p_{M-1}}, \text{SINR}_M^{\bar{s}}]$, $SINR_k^s$ represents a signal-to-interference-plus-noise ratio (SINR) of a stream k when a signal of a stream prior to the stream k is completely removed, and $\overline{S}$ and $\overline{P}$ are values satisfying the following formula:

$$p_1 + \frac{p_1}{SINR_1^s} = p_2 + \frac{p_2}{SINR_2^s} = \ldots = p_M + \frac{p_M}{SINR_M^s}$$

$$\sum_{1 \leq k \leq M} p_k = P$$

wherein s represents a successive interference cancellation order, p represents the transmission power per stream, M represents an integer number of data streams, and P represents the power of the transmitter.

6. The MIMO transmitter according to claim 5, wherein the adaptive transmission control unit controls the data transmission rate per stream by controlling the channel encoding units and the symbol mappers, and controls the transmission power per stream by controlling the precoding/antenna mapping units.

7. The MIMO transmitter according to claim 5, wherein when the adaptive transmission control unit determines the transmission power per stream, the transmission powers of first through (M−1)th streams are allocated as $[\overline{p_1}, \overline{p_2}, \ldots, \overline{p_{M-1}}]$, and the transmission power of an M-th antenna is allocated as $P - \Sigma_{1 \leq k \leq M-1} \overline{p_k}$.

8. The MIMO transmitter according to claim 5, wherein when the adaptive transmission control unit determines the data transfer rate per stream, the adaptive transmission control unit calculates SINRs for first through (M−1)th streams by the following formula:

$$SINR_j^s = \frac{p_j SINR_M^s}{(p_M - p_j)SINR_M^s + p_M},$$

determines the data transfer rate per stream using the SINRs of the data streams, wherein j represents a specific transmitting antenna.

9. A method of controlling a multiple input multiple output (MIMO) system including a transmitter having multiple antennas and a plurality of receivers each having multiple antennas, wherein each user data to be sent to each receiver is sent through streams allocated to each user from among a plurality of streams transmitted from the transmitter, the method comprising the steps of:

estimating, at the receiver a MIMO channel and detecting data streams using signals received from antennas;

extracting, at the receiver, feedback parameters to be fed back to the transmitter using the estimated MIMO channel, and feeding back the feedback parameters to the transmitter; and determining, at the transmitter, streams to be allocated to the receiver from among the streams of the transmitter using the fed-back parameters and the data transmission rate per stream, wherein the feedback parameters are information corresponding to a successive interference cancellation order and a signal-to-interference-plus-noise ratio (SINR) per stream reflecting successive interference cancellation, and wherein in the step of determining, at the transmitter, the streams to be allocated to the receivers and the data transfer rate per stream, streams are allocated to receivers on conditions that one stream cannot be allocated to more than one receiver, and streams prior to a stream i in the successive interference cancellation order fed back from a receiver k should be allocated to the receiver k in order to allocate the stream i to the receiver k, wherein i represents a specific stream from the plurality of data streams, and k represents a specific receiver from the plurality of receivers.

10. The method according to claim 9, wherein the step of extracting and feeding back the feedback parameters at the receiver includes the steps of:

adding, at the receiver, a precoding vector to the feedback parameters to be fed back to the transmitter using the estimated MIMO channel; and extracting information corresponding to the successive interference cancellation order of the case where the precoding vector is used and the SINR per stream reflecting the successive interference cancellation, and feeding back the information to the transmitter.

11. The method according to claim 9, wherein the step of extracting and feeding back the feedback parameters at the receiver includes the steps of:

calculating SINR for each stream of the transmitter when interference of other streams has not been eliminated;

selecting the stream of the transmitter having the largest of the calculated SINRs and storing the stream number and the SINR of the selected stream;

calculating SINRs of remaining streams when interference of the signal generated from the stream selected in the previous step is eliminated;

selecting the stream having the largest of the calculated SINRs and storing the stream number and the SINR of the selected stream;

repeating the previous two steps for every stream or a predetermined number of streams; and feeding back successively stored stream numbers and the SINRs of the selected streams as the feedback parameters to the transmitter, wherein the feedback parameters are the successive interference cancellation order and the SINR of each stream reflecting the successive interference cancellation.

12. The method according to claim 9, wherein in the step of determining, at the transmitter, the streams to be allocated to the receivers and data transfer rate per stream, the streams are allocated such as to maximize performance of the system while satisfying the conditions.

13. The method according to claim 9, wherein in the step of determining, at the transmitter, the streams to be allocated to the receivers and data transfer rate per stream, when a stream is allocated to the receiver, the data transfer rate for the stream is determined on the basis of the fed-back SINR.

14. A multiple input multiple output (MIMO) receiver used in a MIMO system including a transmitter having multiple antennas and a plurality of receivers each having multiple antennas, wherein each user data to be sent to each receiver is sent through streams allocated to each user from among a plurality of streams transmitted from the transmitter, the MIMO receiver comprising:

a symbol detection unit and a decoding unit for restoring a plurality of data streams from a signal vector received from antennas using a successive interference cancellation scheme;

a multiplexing unit for multiplexing and outputting data streams allocated to the receiver from among the data streams;

a channel estimation unit for estimating MIMO channel information based on the signal vector received from the antennas; and a feedback parameter extraction unit for extracting parameters to be fed back using the estimated MIMO channel information, the parameters being a successive interference cancellation order and a signal-to-interference-plus-noise ratio (SINR) per stream reflecting successive interference cancellation, wherein the feedback parameter extraction unit extracts the parameters by:

calculating SINR for each stream of the transmitter when interference of other streams has not been eliminated;

selecting the stream of the transmitter having the largest of the calculated SINRs and storing the stream number and the SINR of the selected stream;

calculating SINRs of remaining streams when interference of the signal generated from the stream selected in the previous step is eliminated;

selecting the stream having the largest of the calculated SINRs and storing the stream number and the SINR of the selected stream; and repeating the previous two steps for every stream or a predetermined number of streams.

15. A multiple input multiple output (MIMO) receiver used in a MIMO system including a transmitter having multiple antennas and a plurality of receivers each having multiple antennas, wherein each user data to be sent to each receiver is sent through streams allocated to each user from among a plurality of streams of the transmitter, the MIMO receiver comprising:

a feedback parameter extraction unit for adding a precoding vector to parameters to be fed back using estimated MIMO channel information, and extracting a successive interference cancellation order of the case where the precoding vector is used and a signal-to-interference-plus-noise ratio (SINR) per stream reflecting successive interference cancellation, wherein the feedback parameter extraction unit extracts the successive interference cancellation order and the SINR per stream reflecting successive interference cancellation by:
- calculating SINR for each stream of the transmitter when interference of other streams has not been eliminated;
- selecting the stream of the transmitter having the largest of the calculated SINRs and storing the stream number and the SINR of the selected stream;
- calculating SINRs of remaining streams when interference of the signal generated from the stream selected in the previous step is eliminated;
- selecting the stream having the largest of the calculated SINRs and storing the stream number and the SINR of the selected stream; and
- repeating the previous two steps for every stream or a predetermined number of streams.

16. A multiple input multiple output (MIMO) transmitter, comprising:
- a user selection unit for allocating a plurality of input user data to streams;
- a plurality of channel encoding units for channel-encoding a plurality of data streams output from the user selection unit;
- a plurality of symbol mappers for mapping the encoded data streams into symbols;
- a plurality of precoding/antenna mapping units for multiplying the symbols by precoding vectors fed back from receivers and sending the multiplied precoding vectors to transmitting antennas, or multiplying the streams by predetermined precoding vectors when the precoding vectors are not fed back from the receivers and sending the multiplied predetermined precoding vectors to transmitting antennas; and
- an adaptive transmission control unit for determining which of streams the input user data are allocated to using received feedback parameters and data transfer rate per stream, the feedback parameter being a successive interference cancellation order and a signal-to-interference-plus-noise ratio (SINR) per stream reflecting successive interference cancellation.

17. The MIMO transmitter according to claim 16, wherein the adaptive transmission control unit controls which of the streams of the transmitter the input user data are allocated to by controlling the user selection unit, and controls the data transfer rate per antenna by controlling the channel encoding units and the symbol mappers.

\* \* \* \* \*